United States Patent [19]
Takami et al.

[11] Patent Number: 5,245,613
[45] Date of Patent: Sep. 14, 1993

[54] DIGITAL SIGNAL TIME-DIVISION MULTIPLEX APPARATUS

[75] Inventors: Masayuki Takami, Yamato; Takehiko Atsumi, Ichikawa, both of Japan

[73] Assignee: Kabushiki Kaisha Toshiba, Kawasaki, Japan

[21] Appl. No.: 702,402

[22] Filed: May 20, 1991

[30] Foreign Application Priority Data

May 21, 1990 [JP] Japan .................. 2-130892

[51] Int. Cl.$^5$ .............................. H04J 3/04; H04J 3/06
[52] U.S. Cl. ........................... 370/112; 370/100.1; 361/792; 361/796
[58] Field of Search ............ 370/84, 112, 85.9, 85.11, 370/100.1; 361/413, 414, 415

[56] References Cited

U.S. PATENT DOCUMENTS

| | | | |
|---|---|---|---|
| 3,963,301 | 6/1976 | Stark | 361/413 |
| 4,488,293 | 12/1984 | Haussmann et al. | 370/84 |
| 4,792,941 | 12/1988 | Yanosy, Jr. et al. | 370/67 |
| 4,881,230 | 11/1989 | Clark et al. | 370/16 |

*Primary Examiner*—Douglas W. Olms
*Assistant Examiner*—Ajit Patel
*Attorney, Agent, or Firm*—Oblon, Spivak, McClelland, Maier & Neustadt

[57] ABSTRACT

In a digital signal time-division multiplex apparatus according to the present invention, digital signals transmitted through a plurality of channels are converted into low-order section frame signals in response to sync signals by low-order section frame processing boards provided for their respective channels. The low-order section frame processing boards are arranged in parallel on a mother board at regular intervals. The low-order section frame signals processed by the low-order section frame processing boards are supplied to a high-order section frame processing board and sequentially selected within one frame, thereby generating time-division multiplex signals. The sync signals are generated by a sync signal generating board and transmitted to a sync signal transmitting line formed on the mother board. The sync signal transmitting line is formed so as to transmit the sync signals in a direction in which the low-order section frame processing boards are arranged. The sync signals are supplied to the low-order section frame processing boards through the sync signal transmitting line in a bus line system. The low-order section frame signals generated from the low-order section frame processing boards are transmitted to a plurality of low-order section frame signal transmitting lines formed in the direction in which the sync signals are transmitted, and supplied to the high-order section frame processing board through the low-order section frame signal transmission lines.

5 Claims, 11 Drawing Sheets

PRIOR ART

DIGITAL SIGNAL TIME-DIVISION MULTIPLEX APPARATUS

BACKGROUND OF THE INVENTION

1. Field of the Invention

The present invention relates to a digital signal time-division multiplex apparatus for time-divisionally multiplexing digital signals transmitted through a plurality of channels.

2. Description of the Related Art

A digital signal time-division multiplex apparatus generally comprises a low-order section frame processor, a high-order section frame processor, and a sync signal generator. As a preliminary treatment of time-division multiplexing, the low-order section frame processor converts digital signals input transmitted through a plurality of channels into low-order section frame signals which are synchronized with one another. The high-order section frame processor receives the low-order section frame signals and selectively outputs the signals within a one-frame period, thereby time-divisionally multiplexing the signals to generate high-order section frame signals. The sync signal generator generates sync signals such as clocks and tuning pulses necessary for a frame converting operation of the low-order section frame processor and a switching operation of a time-division multiplex processor.

The high-order section frame processor and the sync signal generator are each formed of a single electronic circuit board because their processing functions are simple. The low-order section frame processor necessitates a complicated function such as code conversion, frame processing, and buffering. If all the channels are formed in a single electronic circuit board, a mounting area of the board becomes too large. Further, the channels have to be extended. One electronic circuit board is therefore provided for each of the channels.

Since, however, the high-order section frame processor processes a signal of remarkably high frequency, it is arranged away from the low-order section frame processor so as not to exert an adverse influence, such as undesirable radiation, upon the low-order section frame processor.

Figure 1:
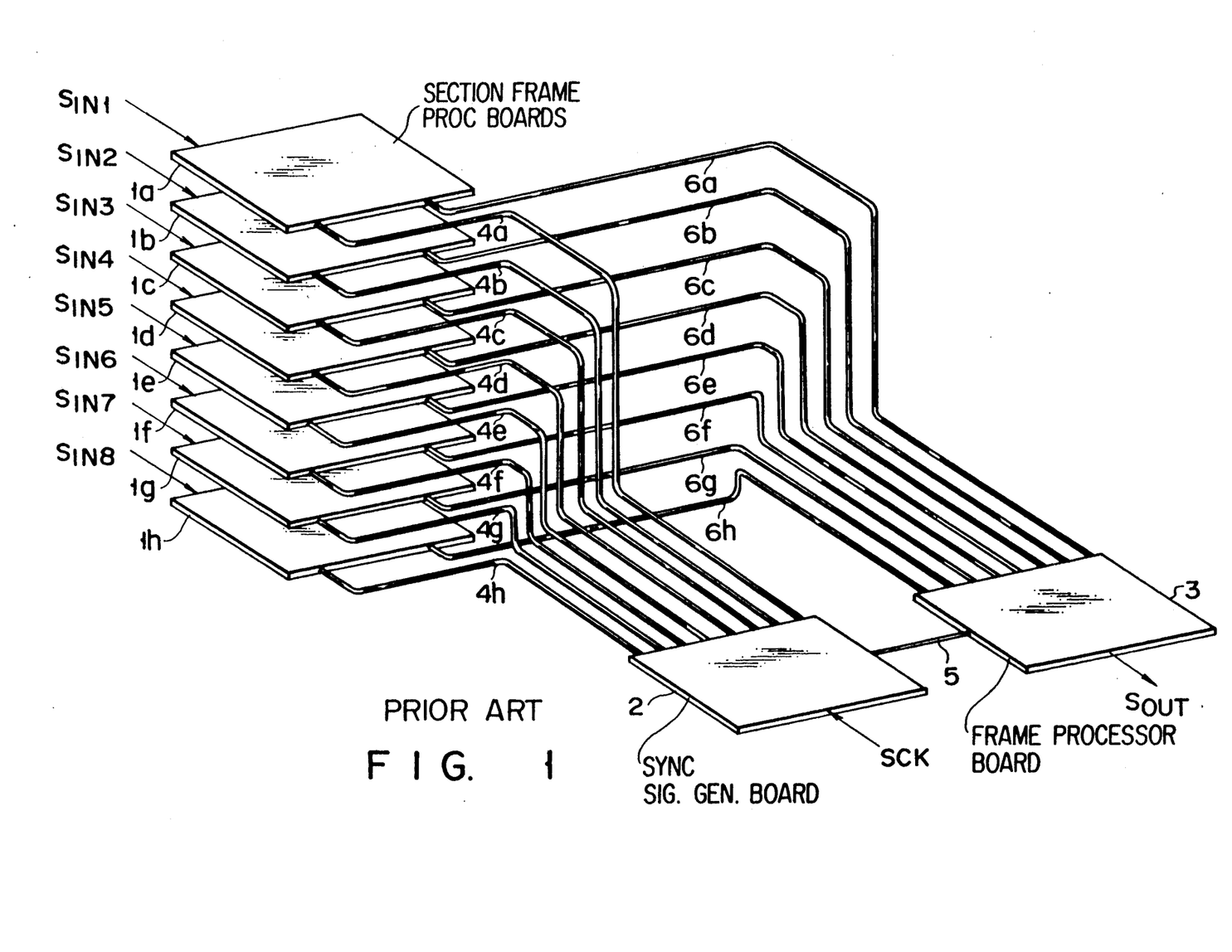
FIG. 1 is a view showing a structure of a conventional digital signal time-division multiplex apparatus.
Figure 2:
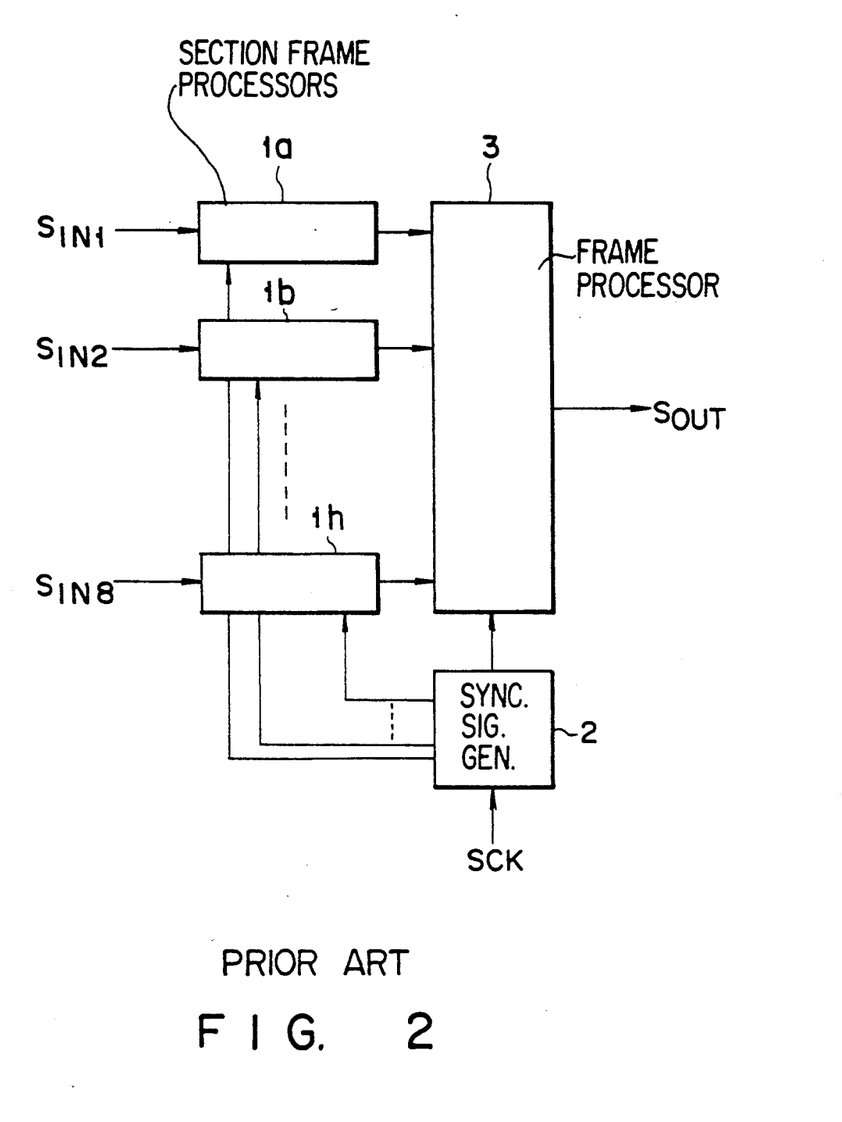
FIG. 2 is a view illustrating a wiring state of the apparatus shown in FIG. 1.

FIG. 1 shows the structure of a conventional digital signal time-division multiplex apparatus for eight channels, and FIG. 2 is a block diagram showing the conventional apparatus. The blocks of FIG. 2 correspond to the circuit boards of FIG. 1.

In FIGS. 1 and 2, reference numerals 1a to 1h indicate boards each constituting a low-order section frame processor, 2 denotes a board constituting a sync signal generator, and 3 represents a board constituting a high-order section frame processor.

The sync signal generating board 2 receives system clocks SCK to synchronize the board 2 with an external device. In response to the system clocks, the board 2 generates frame sync signals (including clocks), which are to be supplied to the low-order section frame processing boards 1a to 1h, and switching control signals (including clocks) which are to be supplied to the high-order section frame processing board 3. The frame sync signals are transmitted to the boards 1a to 1h through cables 4a to 4h, and the switching control signals are transmitted to the board 3 through a cable 5.

The low-order section frame processing boards 1a to 1h receive digital signals $S_{IN1}$ to $S_{IN8}$ from channels 1CH to 8CH, respectively, and convert the digital signals into low-order section frame signals in response to the frame sync signals transmitted through the cables 4a to 4h. The low-order section frame signals are transmitted to the high-order section frame processing board 3 through cables 6a to 6h.

The board 3 receives the low-order section frame signals from the cables 6a to 6h and selectively outputs the signals in predetermined order in response to the switching control signals transmitted through the cable 5, thereby time-divisionally multiplexing the signals to generate a high-order section frame signal $S_{OUT}$. The high-order section frame signal $S_{OUT}$ is transmitted to, for example, a transmitter.

A high-speed transmission of digital signals has recently been attained in accordance with progress in digital signal processing technology and in communication technology. Accordingly, high-speed processing is required in the digital signal time-division multiplex apparatus.

To achieve the high-speed processing, however, a difference in length between signal transmission paths in the channels has to be prevented from affecting a phase difference between channel signals. Unless the phases of the low-order section frame signals of all the channels are the same at input terminals, the high-order section frame processing board 3 cannot fulfill a normal successive selecting function.

As described above, in the conventional digital signal time-division multiplex apparatus, the cables 4a to 4h connecting the sync signal generating board 2 and the low-order section frame processing boards 1a to 1h are set to have the same length, so that the phases of the frame sync signals are equalized at the input terminals of the boards 1a to 1h, and the processings of the boards 1a to 1h are synchronized with one another, thereby outputting the low-order section frame signals in the same phase. Further, the cables 6a to 6h connecting the boards 1a to 1h and the board 3 are set to have the same length so that the low-order section frame signals output from the boards 1a to 1h in the same phase are supplied to the base 3 in the same timing.

In the above method for adjusting the phases, the lengths of the cables 4a to 4h and those of the cables 6a to 6h have to be adjusted to the longest cables, respectively, and then the cables have to be formed while adjusting the residual length of each cable. For this reason, a handling operation of these cables is very complicated. The more the channels and the higher the signal transmission speed, the more complicated the handling operation. The reliability of the apparatus is therefore deteriorated.

SUMMARY OF THE INVENTION

It is accordingly an object of the present invention to provide a digital signal time-division multiplex apparatus wherein cables can be formed with good operability without taking into consideration a phase relationship, and the number of channels can flexibly be changed, resulting in improvement in reliability.

According to the present invention, there is provided a digital signal time-division multiplex apparatus for time-divisionally multiplexing digital signals transmitted through a plurality of channels, comprising:

a plurality of low-order section frame processing boards each formed in each of the channels, for receiving the digital signals and converting the digital signals into low-order section frame signals in response to sync signals;

a high-order section frame processing board for sequentially selecting the low-order section frame signals output from the low-order section frame processing boards through the channels within one frame, and converting the low-order section frame signals into high-order section frame signals to generate time-division multiplex signals;

a sync signal generating board for generating the sync signals;

a mother board on which the low-order section frame processing boards are arranged in parallel at regular intervals, the mother board including at least one sync signal transmitting line formed to receive the sync signals from the sync signal generating board, transmit the sync signals in a direction in which the low-order section frame processing boards are arranged, and supply the sync signals to the low-order section frame processing boards in a bus line system, and a plurality of low-order section frame signal transmitting lines formed to receive the low-order section frame signals from the low-order section frame processing boards and transmit the low-order section frame signals in the direction in which the sync signals are transmitted;

sync signal transmitting means for transmitting the sync signals generated from the sync signal generating board to the sync signal transmitting line of the mother board; and low-order section frame signal transmitting means for transmitting the low-order section frame signals from the low-order section frame signal transmitting lines of the mother board to said high-order section frame processing board.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described in detail with reference to the accompanying drawings.

Figure 3:
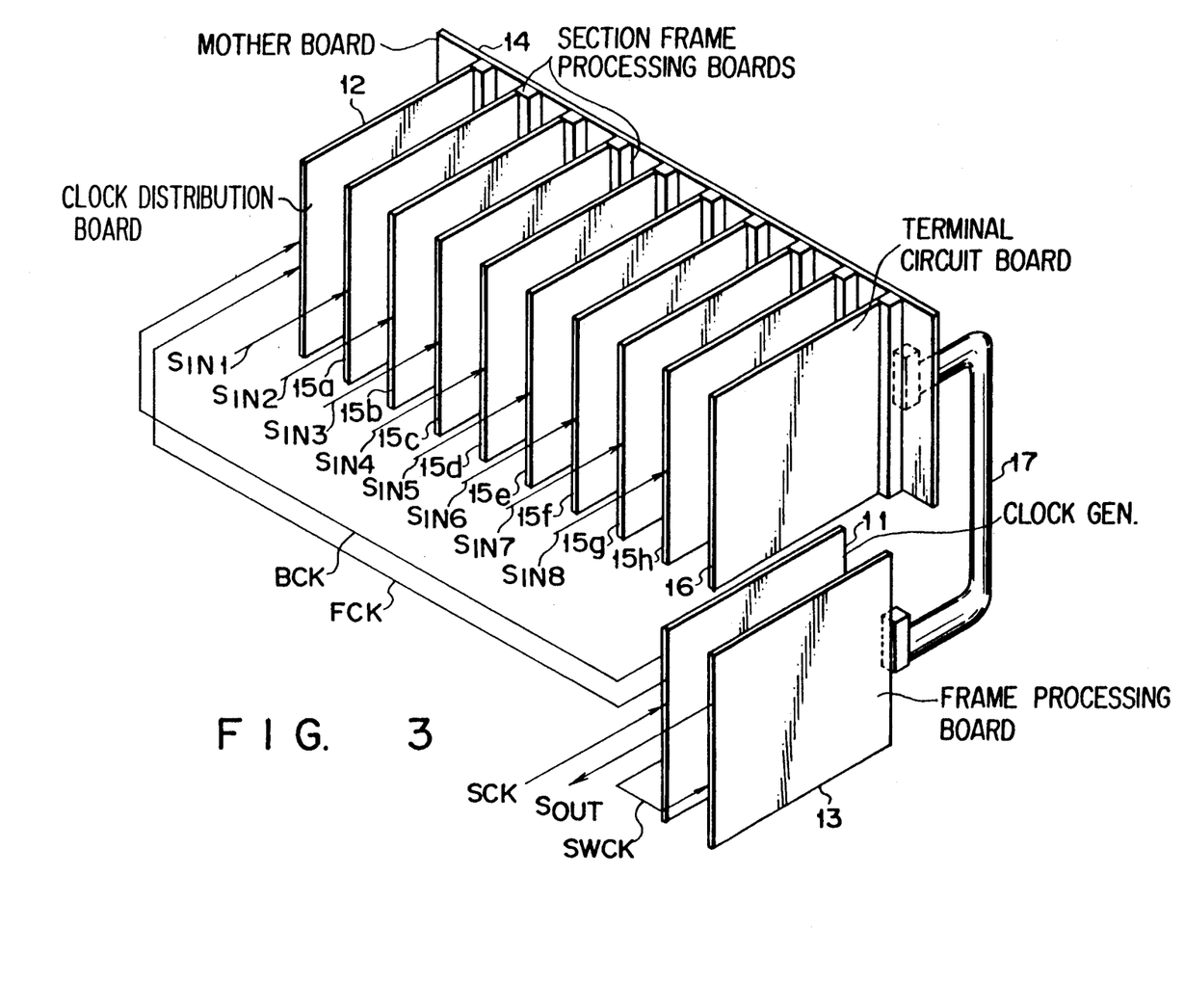
FIG. 3 is a view showing the entire structure of a digital signal time-division multiplex apparatus according to an embodiment of the present invention.
Figure 4:
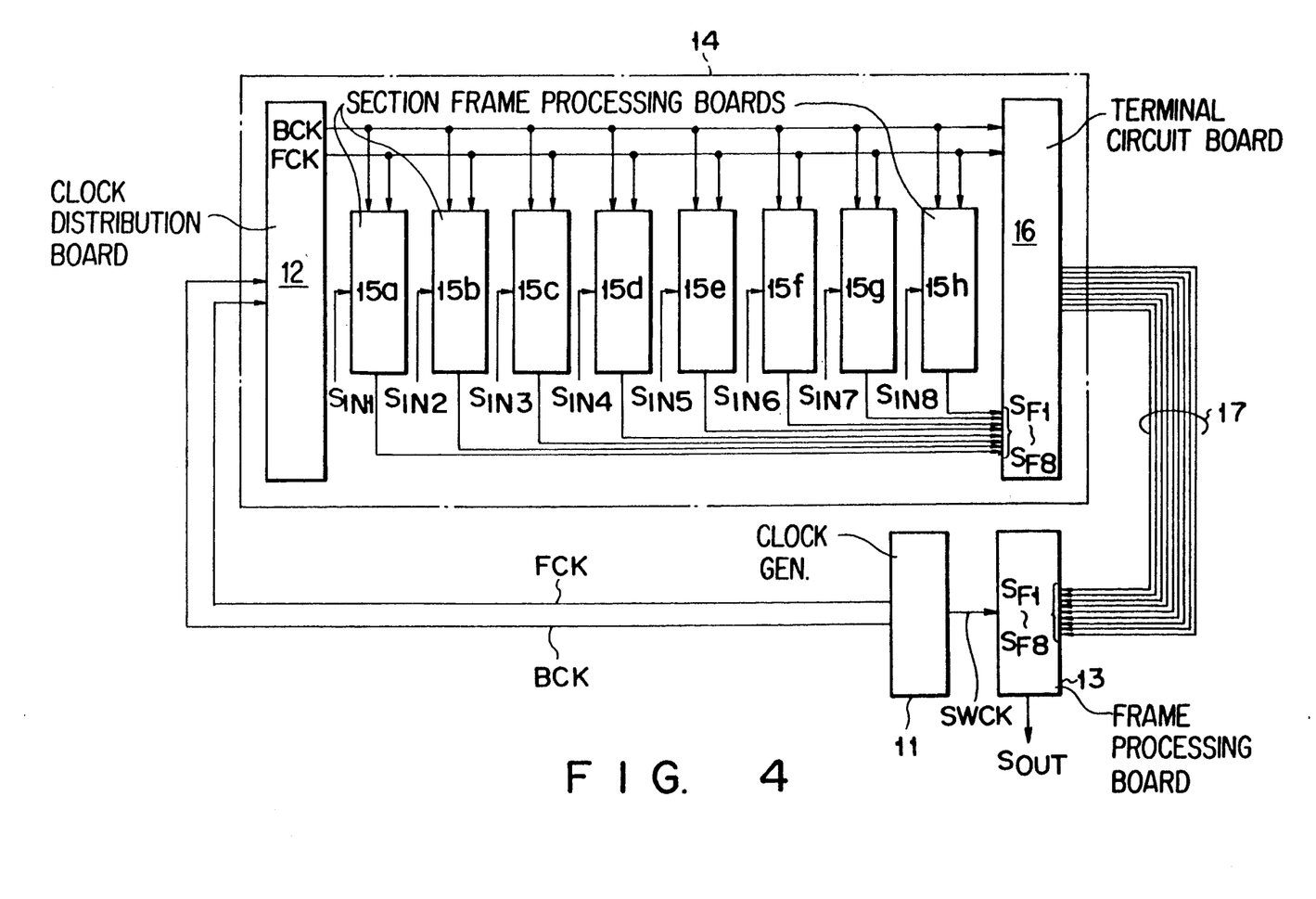
FIG. 4 is a view illustrating a wiring state of the apparatus shown in FIG. 3.

FIG. 3 shows the entire structure of a digital signal time-division multiplex apparatus according to the present invention and FIG. 4 shows a wiring state of the apparatus. The apparatus shown in FIGS. 3 and 4 time-divisionally multiplexes digital signals transmitted through eight channels.

Figure 5:
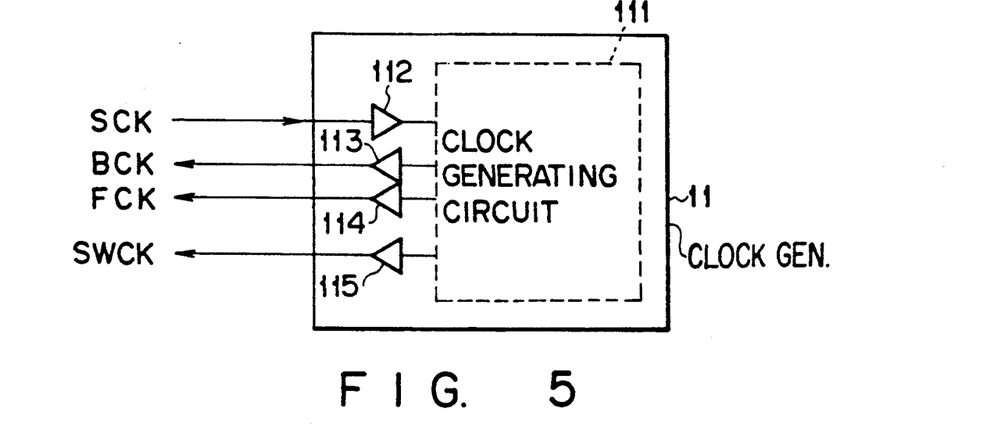
FIG. 5 is a view illustrating a structure of a clock generation board of the apparatus shown in FIG. 3.

In FIG. 3, reference numeral 11 denotes a clock generating board. The board 11 includes a clock generation circuit 111 and clock input/output buffer amplifiers 112 to 115, as shown in FIG. 5. The clock generation circuit 111 receives a system clock SCK through the buffer amplifier 112 to synchronize the circuit 111 with an external device. The clock generation circuit 111 generates a bit clock BCK for processing a low-order section frame and a switching clock SWCK for processing a high-order section frame in response to the system clock SCK. It also generates a frame clock FCK in response to the bit clock BCK.

The clocks BCK and FCK are supplied to a clock distribution board 12 through the buffer amplifiers 113 and 114, and the high-order section frame processing clock SWCK is supplied to a high-order section frame processing board 13 through the buffer amplifier 115.

Figure 6:
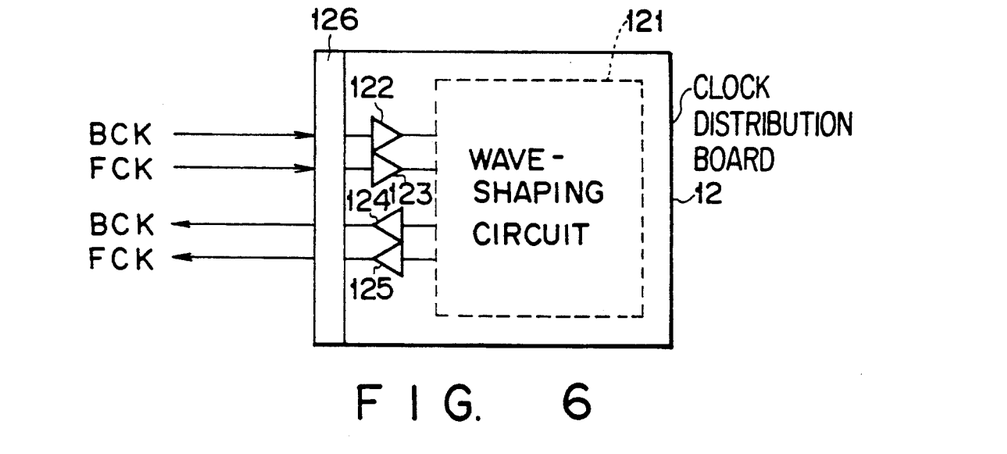
FIG. 6 is a view illustrating a structure of a clock distribution board of the apparatus shown in FIG. 3.

As illustrated in FIG. 6, the clock distribution board 12 includes a wave-shaping circuit 121 and clock input/output buffer amplifiers 122 to 125, and its end portion is provided with a connector 126.

The clock signals BCK and FCK generated from the clock generating board 11 are supplied to the wave-shaping circuit 121 through the buffer amplifiers 122 and 123. The wave-shaping circuit 121 shapes the fall and rise edges of the waves of the clocks BCK and FCK. The wave-shaped clocks BCK and FCK are supplied to a predetermined terminal of a connector 126 through the buffer amplifiers 124 and 125, respectively.

In FIGS. 3 and 4, reference numeral 14 indicates a mother board. The distribution board 12, the low-order section frame processing boards 15a to 15h, and a terminal circuit board 16 are arranged on the mother board at predetermined intervals and they are electrically connected to one another. More specifically, the mother board 14 is a transmission path wiring board for receiving the clocks BCK and FCK from the clock distribution board 12, supplying them to the low-order section frame processing boards 15a to 15h of each channel in a bus line system, receiving signals processed by the boards 15a to 15h, and supplying them to the terminal circuit board 16. The mother board will be described in detail later.

Since the low-order section frame processing boards 15a to 15h have the same structure, board 15a will be given by way of example.

Figure 7:
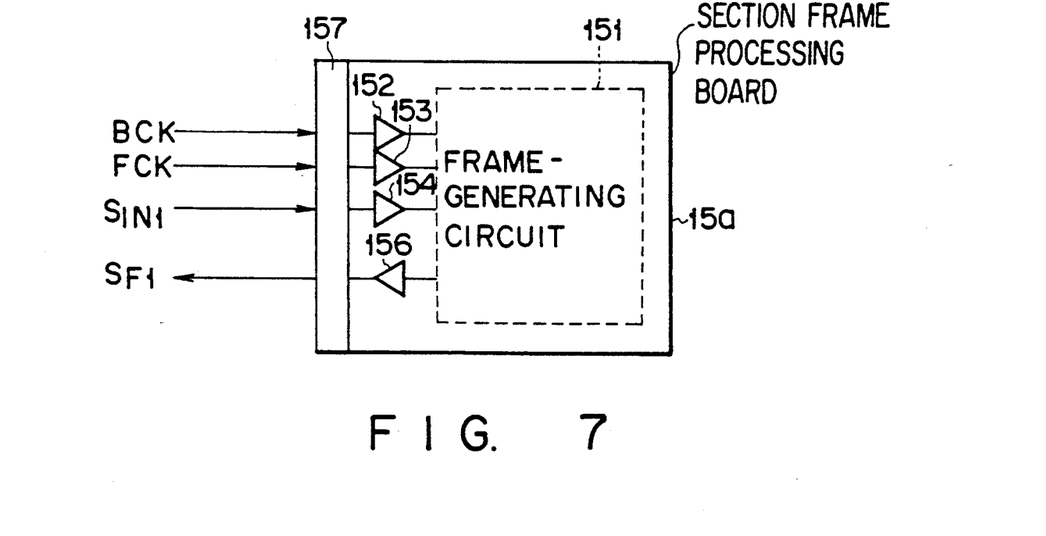
FIG. 7 is a view illustrating a structure of a low-order section frame processing board of the apparatus shown in FIG. 3.

As illustrated in FIG. 7, the low-order section frame processing board 15a includes a frame generating circuit 151 and buffer amplifiers 152 to 156, and its end portion is provided with a connector 157 for connecting the board 15a to the mother board 14. The board 15a is supplied with clocks BCK and FCK and digital signal $S_{IN1}$ through the connector 157. These signals are supplied to the frame generating circuit 151 through the buffer amplifiers 152 to 154.

The frame generating circuit 151 converts the digital signal $S_{IN1}$ into a low-order section frame signal $S_{F1}$ on the basis of the clocks BCK and FCK. The low-order section frame signal $S_{F1}$ is transmitted to the mother board 14 through the buffer amplifier 156 and connector 157, then to the terminal circuit board 16.

Figure 8:
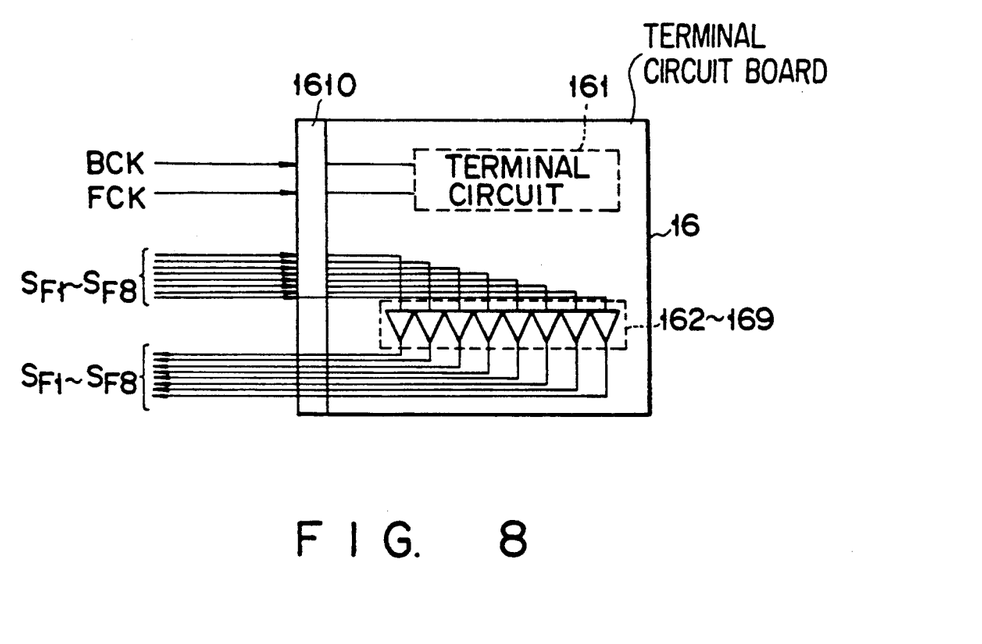
FIG. 8 is a view illustrating a structure of a terminal circuit board of the apparatus shown in FIG. 3.

As shown in FIG. 8, the terminal circuit board 16 includes a terminal circuit 161 and buffer amplifiers 162 and 169 and its end portion is provided with a connector 1610 for connecting the board 16 to the mother board 14. The terminal circuit 161 is connected to BCK and FCK bus lines of the mother board 1 through the connector 1610 to perform a terminal processing of each of the lines. The board 16 receives the low-order section frame signals $S_{F1}$ to $S_{FS}$ processed by the low-order section frame processing boards 15a to 16f from the mother board 14 through the connector 1610. After the low-order section frame signals are amplified to a predetermined level by the buffer amplifiers 162 and 169, the board 16 sends the amplified signals to a flat cable 17 connected to the backside of the mother board 14 through the connector 1610.

Figure 9:
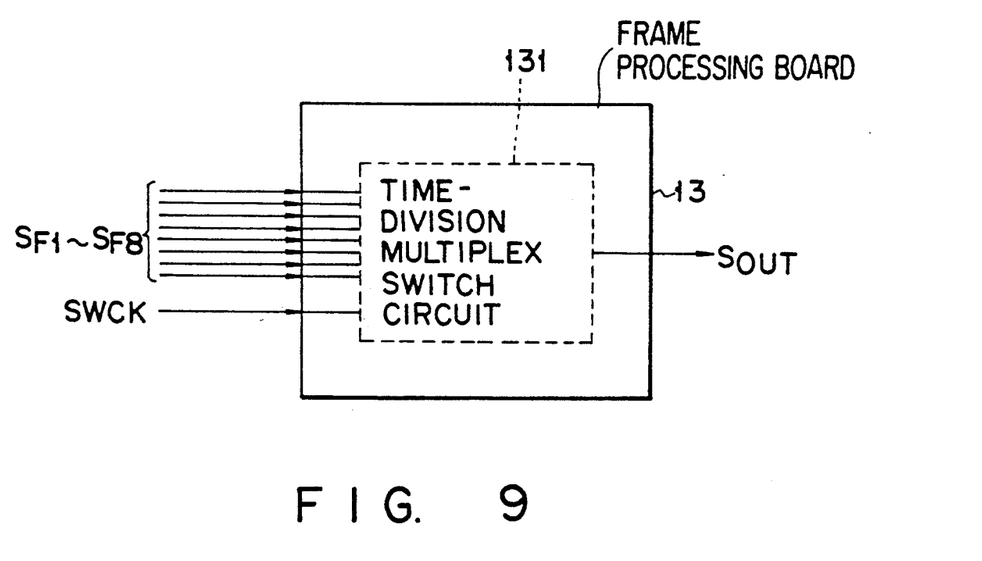
FIG. 9 is a view illustrating a structure of a high-order section frame processing board of the apparatus shown in FIG. 3.

The cable 17 is connected to the high-order section frame processing board 13. As shown in FIG. 9, the board 13 includes a time-division multiplex switch circuit 131 for selectively outputting the low-order section frame signals $S_{F1}$ to $S_{F8}$ transmitted through the cable 17 in response to the switching clock SWCK output from the clock generating board 11 thereby to produce a time-division multiplex signal $S_{OUT}$.

Figure 10:
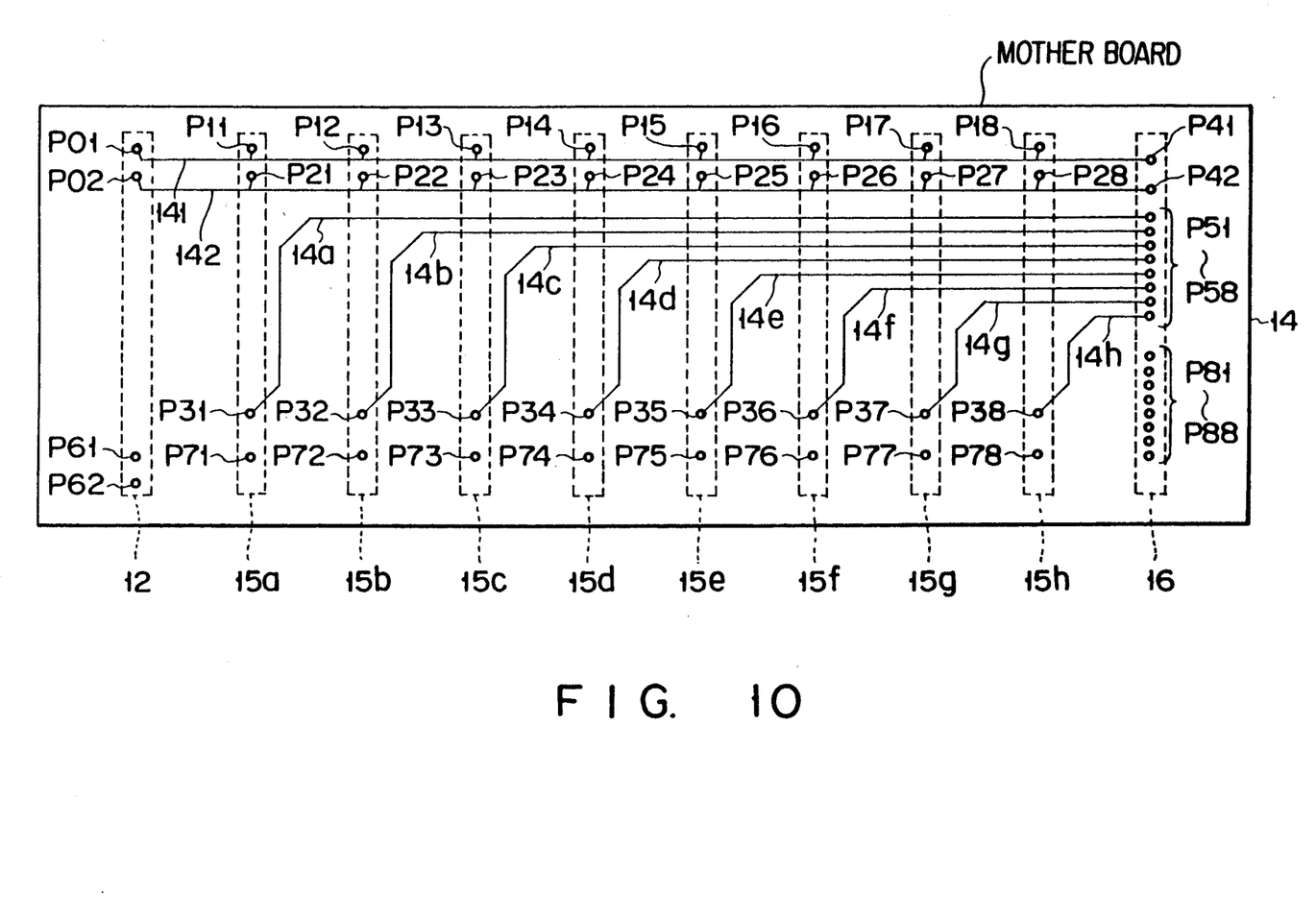
FIG. 10 is a view illustrating a structure of a mother board of the apparatus shown in FIG. 3.

The structure of the mother board 14, which is the most important feature of the present invention, will be described with reference to FIG. 10. In FIG. 10, the dotted lines show positions in which the clock distribution board 12, the low-order section frame processing boards 15a to 15h, and the terminal circuit board 16 are to be arranged on the mother board 14.

In the position where the clock distribution board 12 is to be arranged, connector pins P01 and P02 for receiving clocks BCK and FCK, which are to be connected to the connector 126 of the board 12, are provided. These connector pins P01 and P02 are connected to BCK bus line 141 and FCK bus line 142 formed on the mother board, respectively.

In the positions where the low-order section frame processing boards 15a to 15h are to be arranged, connector pins P11 to P18 and P21 to P28 connected to the BCK and FCK bus lines 141 and 142, respectively, connected to the connector 157 of the boards 15a to 15h, and supplying the clocks BCK and FCK to the boards 15a to 15h, are provided. Further, connector pins P31 to P38 connected to the connector 157 and receiving the low-order section frame signals $S_{F1}$ to $S_{F8}$, are provided therein. The connector pins P31 to P38 are connected to frame signal lines 14a to 14h formed on the mother board 14.

In the position where the terminal circuit board 16 is to be arranged, connector pins P41 and P42 connected to the BCK and FCK bus lines 141 and 142, respectively, connected to the connector 1610 of the board 16, and supplying the clocks BCK and FCK to the board 16 are provided. Furthermore, connector pins P51 to P58 connected to the frame signal lines 14a to 14h, connected to the connector 1610 of the board 16, and supplying the low-order section frame signals $S_{F1}$ to $S_{F8}$ to the board 16 are provided therein In FIG. 10, reference numerals P61 and P62 denote connector pins for supplying the clocks BCK and FCK to the clock distribution board 12, P71 to P78 show connector pins for supplying digital signals $S_{IN1}$ to $S_{IN8}$ to the low-order section frame processing boards 15a to 15h, respectively, P81 to P88 indicate connector pins for receiving the low-order section frame signals $S_{F1}$ to $S_{F8}$ from the terminal circuit board 16.

The above-described connector pins are fitted into the mother board 14 by solder or press fit so that they can be connected from the back of the board 14. The lines 141, 142, and 14a to 14h are each formed by a microstrip and connected to the connector pins by tapping. As is apparent from FIG. 10, each of the lines is not bent at right angles in order to prevent a transmission signal from being reflected.

An operation of the mother board 14 having the above structure will be described.

The clocks BCK and FCK transmitted from the clock distribution board 12 to the mother board, are supplied to the low-order section frame processing boards 15a to 15h through the bus lines 141 and 142, respectively. Since the bus lines 141 and 142 are connected to the terminal circuit 161 of the board 16, they are maintained at a fixed level. The low-order section frame processing boards 15a to 15h generate low-order section frame signals $S_{F1}$ to $S_{F8}$ in response to the clocks BCK and FCK from the bus lines 141 and 142. The signals $S_{F1}$ to $S_{F8}$ are sent out to the terminal circuit board 16 through the frame signal lines 14a to 14h.

Since the low-order section frame processing boards 15a to 15h have the same structure, substantially the same frame processing time is required by each of the boards 15a to 15h. Since, however the boards 15a to 15h are arranged in parallel with the clock distribution board 12 at predetermined intervals, the clocks arrive earlier to the low-order section frame processing boards arranged nearer to the board 12. Thus, the frame processings of the boards 15a to 15h are not performed at the same time, and they are performed in sequence from the low-order section frame processing boards arranged nearer to the board 12. Furthermore, since the low-order section frame processing boards 15a to 15h are also arranged in parallel with the terminal circuit board 16 at predetermined intervals, the low-order section frame signals arrive earlier to the low-order section frame processing boards arranged nearer to the board 16. The low-order section frame signals are transmitted to the terminal circuit board 16 in sequence from the low-order section frame processing board arranged nearer to the board 16.

Assuming that time required for processing a frame by a low-order section frame processing board 15i (i is a to h) is Ti, time required from when the clocks BCK and FCK are transmitted from the clock distribution board 12 to when they arrive at the low-order section frame processing board 15i is Tx, and time required until the low-order section frame signal $S_{Fi}$ transmitted from the board 15i arrives at the terminal circuit board 16 is Ty, time T required from when the clocks BCK and FCK are transmitted to when the low-order section frame signal $S_{Fi}$ arrives at the board 16 is expressed by the following equation.

$$T = Tx + Ti + Ty$$

Since time Ts required for transmitting electrical signals between adjacent boards 12, 15a to 15h, and 16 is the same, if the number of channels is n, the following equation is given.

$$Tx = n \times Ts$$

$$Ty = \{8 - (n-1)\} \times Ts$$

The time T is thus represented as follows.

$$T = 9 \times Ts + Ti$$

The time T is true of all the channels. The low-order section frame signals $S_{F1}$ to $S_{F8}$ output from the low-order section frame processing boards 15a to 15h thus reach the terminal circuit board 16 in the same phase.

The terminal circuit board 16 outputs the low-order section frame signals $S_{F1}$ to $S_{F8}$ without adjusting their phases, and the flat cable 17 transmits the low-order section frame signals $S_{F1}$ to $S_{F8}$ of each of the channels to the high-order section frame processing board 13 in the same phase. Therefore, the low-order section frame signals $S_{F1}$ to $S_{F8}$ have the same phase when they are input to the high-order section frame processing board 13.

According to the structure of the mother board described above, the low-order section frame processing boards 15a to 15h of each channel do not have to process frames at the same timing, and the low-order section frame signals $S_{F1}$ to $S_{F8}$ finally having the same phase are produced if a clock for sync processing is simply supplied to the mother board 14. Consequently, a conventional complicated cable wiring operation need not be performed, and the mother board can be improved in reliability as much a possible.

It is preferable to use the following method when the clocks BCK and FCK are supplied to the low-order frame section processing boards 15a to 15h in a bus line system.

Figure 11:
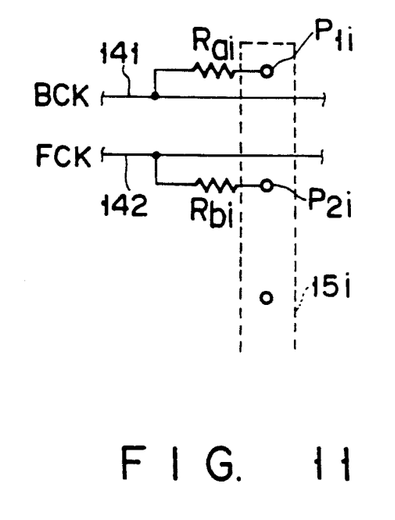
FIGS. 11 to 13 are views illustrating a structure of a connecting portion between the low-order section frame processing board shown in FIG. 7 and the mother board shown in FIG. 10.
Figure 12:
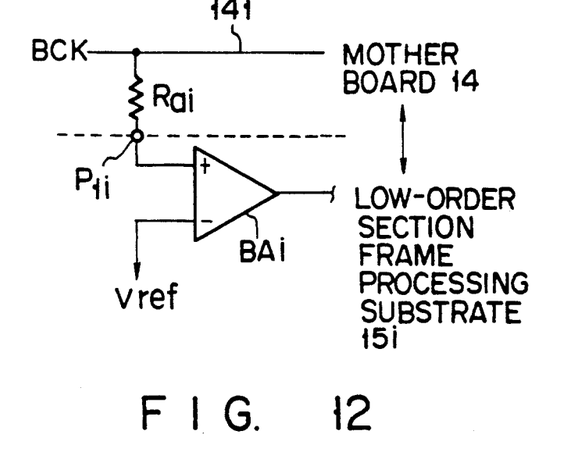

A connection between the mother board 14 and the low-order section frame processing board 15i of the i channel (i is a to h) will be described by way of example. As shown in FIG. 11, on the mother board 14, connector pins P1i and P2i, which are to be attached to the board 15i, are connected to the bus lines 141 and 142 through resistors Rai and Rbi, respectively. The connection of the connector pin P1i and the bus line 141 supplied with the clock BCK is shown in FIG. 12. In FIG. 12, BAi represents a buffer amplifier for receiving the clock BCK on the low-order section frame processing board 15i and Vref indicates a reference voltage. The connection of the connector pin P2i and the bus line 142 supplied with the clock FCK is the same as shown in FIG. 12.

Figure 13:
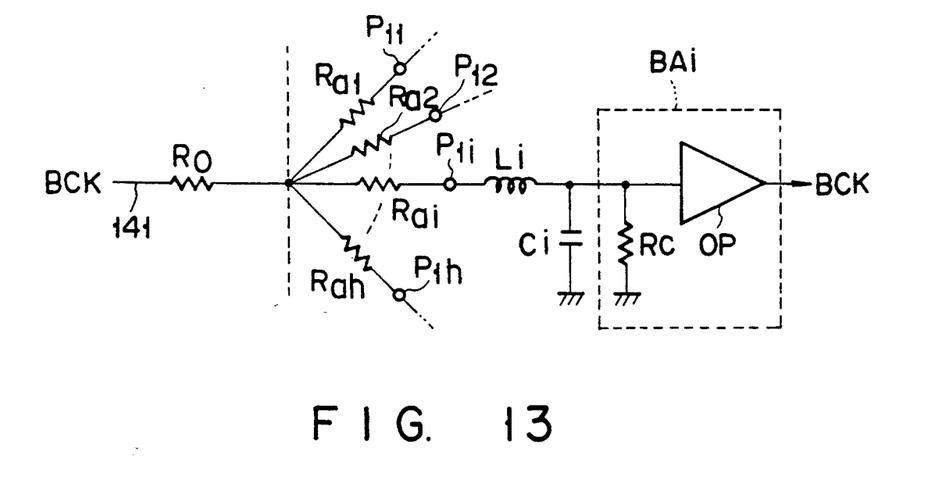

FIG. 13 illustrates an equivalent circuit for the connection shown in FIG. 12. In FIG. 13, Li denotes an inductance caused at a connecting point of the connector pin P1i alongside the mother board 14 and the connector 157 alongside the board 15i, Ci indicates a floating capacitance at the connecting point, OP represents an operational amplifier in the buffer amplifier BAi, and Rc shows an input impedance of the buffer amplifier.

The BCK bus line 141 has a line impedance R0 against the transmitted clock BCK. The lower the line impedance R0, the better, however, it cannot be set to be zero. If the frequency of the clock BCK increases in accordance with high-speed transmission of a signal to be multiplexed, the line impedance R0 is increased and cannot be neglected. The line impedance R0 is thus determined so that the clock BCK is set at an emitter-coupled logic (ECL) level, in view of the capability of an electronic circuit, the size of a wiring pattern and so on.

To be noted here is the input impedance Rc in the buffer amplifier BAi alongside of the board 15i. Of course, the input impedance Rc has to be considerably higher than the line impedance R0. Since, however, the plural low-order section frame processing boards 15a to 15h are connected to the BCK bus line 141, the input impedance Rc is connected in parallel with the line impedance R0.

When all the boards 15a to 15h are connected, an input impedance Ri is lowered to ⅛, and the amplitude of the transmitted clock BCK is reduced to half, which adversely affects the operation of the operational amplifier OP. If the input impedance Ri is lowered, the inductance Li and floating capacitance Ci are caused at the connecting point of the connector pin P1i and the connector 157, which form a filter and make the waveform of the transmitted clock BCK dull.

If the resistor Rai is interposed between the bus line 141 and connector pin P1i as shown in FIG. 11, resistors Rai are arranged in series in lines branching from the bus line 141 through which the clock BCK is transmitted and accordingly the input impedance can be prevented from decreasing. The clock BCK can thus be supplied to the boards 15a to 15h with high quality. The same is true of the bus line 142 through which the clock FCK is transmitted.

The advantage of the decrease in input impedance can be expected if each of values of the resistors Rai and Rbi is substantially the same as or about ten times as high as that of the line impedance R0. When there is no variation in DC components of the clocks BCK and FCK, an operating point need not be taken into consideration if a capacitor is inserted when the low-order section frame processing boards 15a to 15h are mounted on the mother board. It is desirable that a resistor be interposed between the bus line 141 and connector pin P41 and between the bus line 142 and connector pin P42.

In the embodiment shown in FIG. 3, neither the clock generating board 11 nor the high-order section frame processing board 13 is mounted on the mother board 14. The reason is as follows. Since the switching clock SWCK having a relatively high frequency is processed by the boards 11 and 13, the boards 11 and 13 have to be shielded so that the switching clock SWCK does not adversely affect the operations of the low-order section frame processing boards 15a to 15h. It is desirable that the flat cable 17 be shorter and that the clock generating board 11 be arranged near the high-order section frame processing board 13 in order to prevent the transmitting state of the switching clock SWCK from deteriorating. If the boards 11 and 13 remain shielded, it will be preferable to mount the boards 11 and 13 as well as the low-order section frame processing boards on the same mother board.

Figure 14:
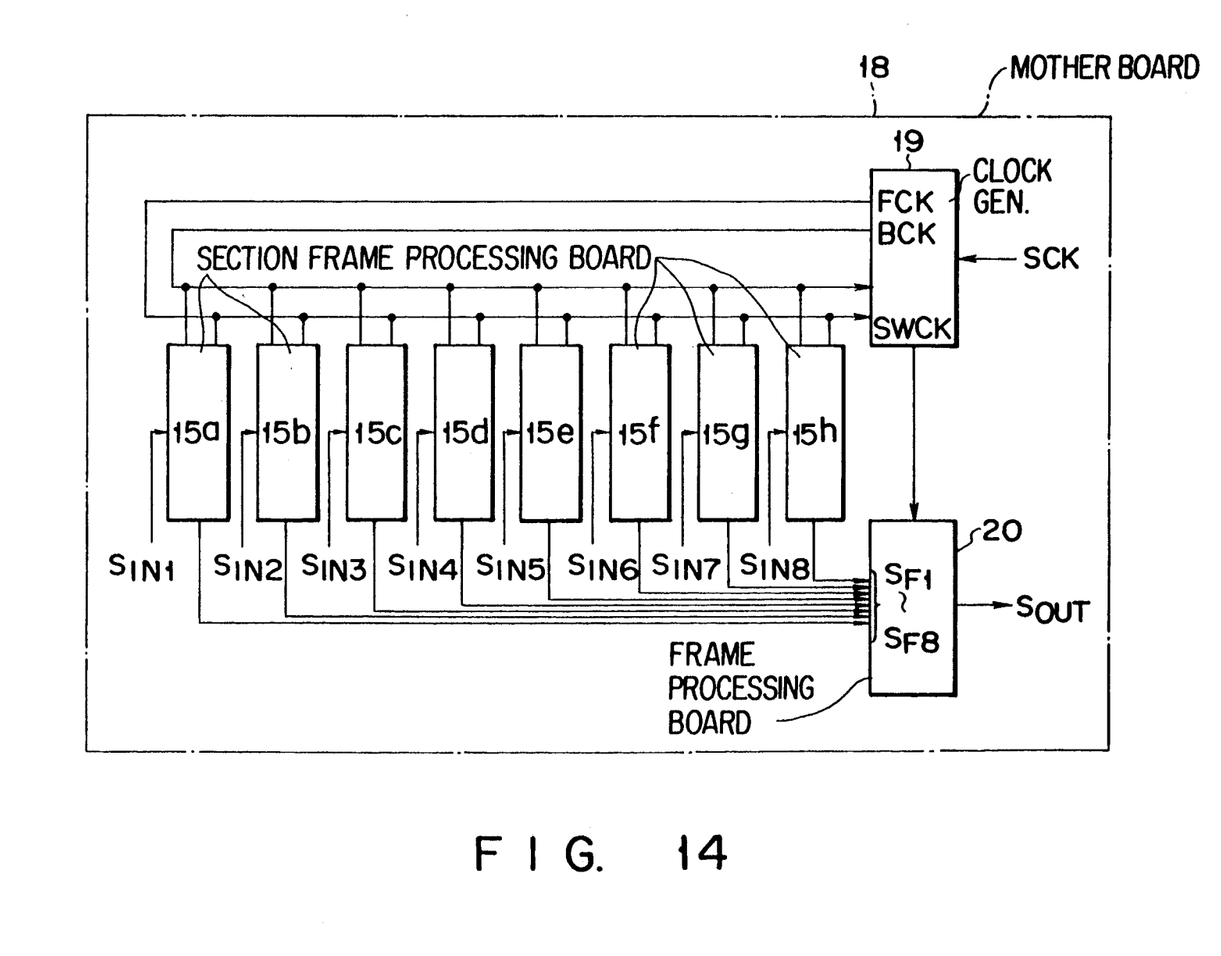
FIG. 14 is a view illustrating a wiring state of a digital signal time-division multiplex apparatus according to another embodiment of the present invention.

FIG. 14 illustrates the entire circuit arrangement of a digital signal time-division multiplex apparatus according to another embodiment in which the above situation is taken into consideration. In FIG. 14, the same elements as those of FIG. 4 are denoted by the same reference numerals.

In FIG. 14, numeral 18 indicates a mother board on which a clock generating board 19 and a high-order section frame processing board 20 as well as low-order section frame processing boards 15a to 15h are mounted. Neither the clock distribution board nor the terminal circuit boards, as shown in FIG. 4, is mounted thereon.

Figure 15:
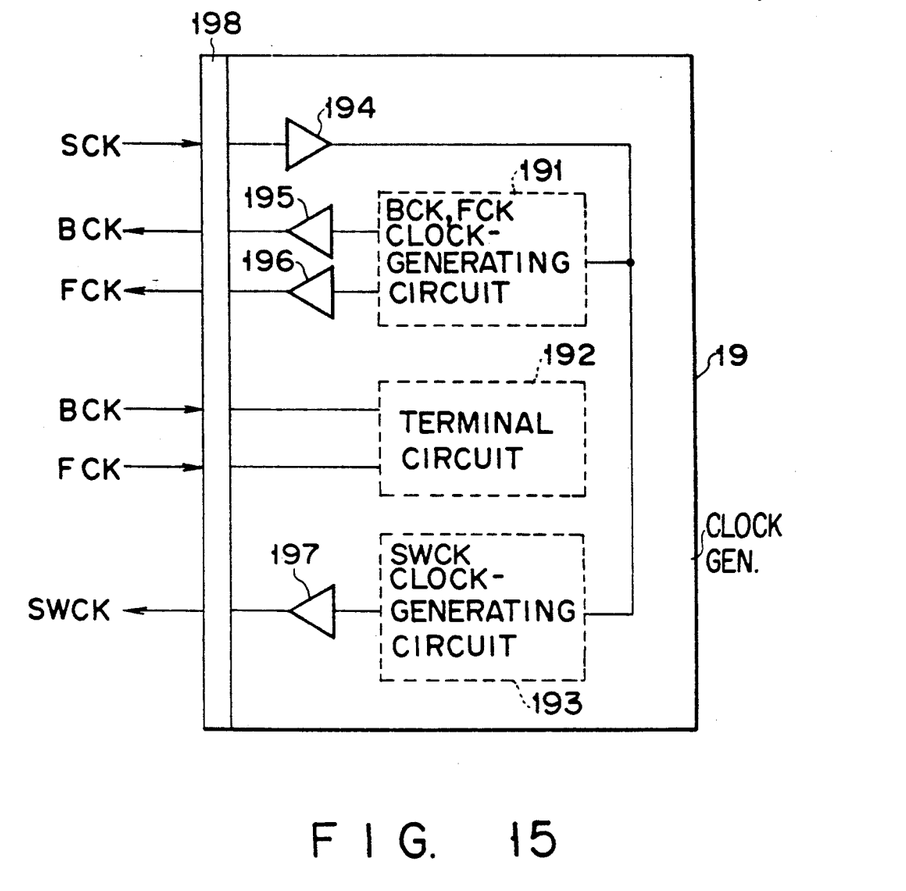
FIG. 15 is a view illustrating a structure of a clock generation board of the apparatus shown in FIG. 14.

The clock generating board 19 includes a BCK/FCK clock generating circuit 191, a terminal circuit 192, a SWCK clock generating circuit 193, and clock transmitting/receiving buffer amplifiers 194 to 197, as shown in FIG. 15. A connector 198 is attached to one end of the clock generating board 19 to connect the board 19 with the mother board 18. The connector 198 has an input terminal of system clock SCK, output terminals of clocks BCK and FCK, input terminals of clocks BCK and FCK, and an output terminal of clock SWCK.

The system clock SCK is supplied to the connector 198 and then to the BCK/FCK clock generating circuit 191 and the SWCK clock generating circuit 193 through the buffer amplifier 194, thereby generating clocks BCK, FCK and SWCK. These clocks generated in the clock generating circuits 191 and 193 are transmitted to a predetermined terminal of the connector 198. The clocks BCK and FCK transmitted to the connector 198 are directly supplied to the terminal circuit 192.

Figure 16:
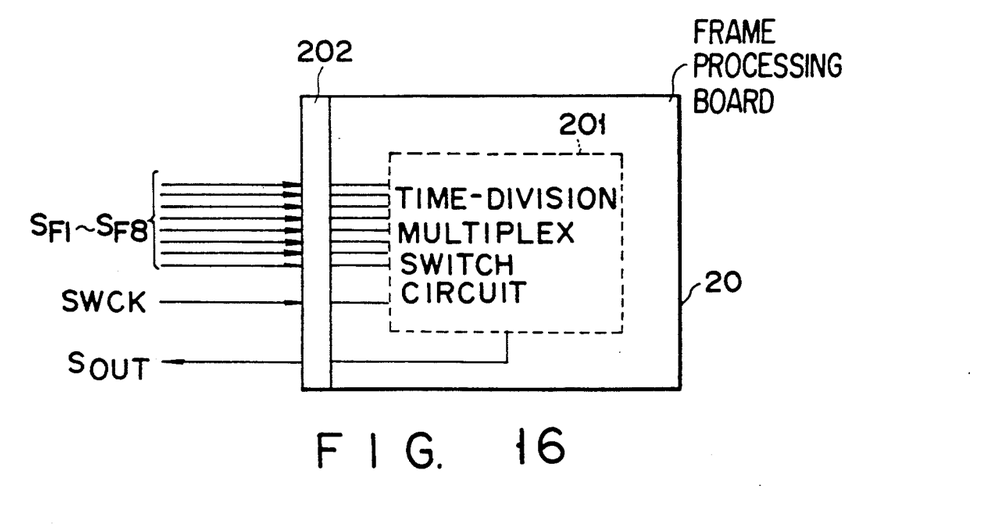
FIG. 16 is a view illustrating a structure of a high-order section frame processing board of the apparatus shown in FIG. 14.

The high-order section frame processing board 20 includes a time-division multiplex switch circuit 201, as shown in FIG. 16. A connector 202 is attached to one end of the high-order section frame processing board 20 to connect the board 20 with the mother board 18. The connector 202 has input terminals of low-order section frame signals $S_{F1}$ to $S_{F8}$, an input terminal of clock SWCK, and an output terminal of high-order section frame signal $S_{OUT}$.

The low-order section frame signals $S_{F1}$ to $S_{F8}$ supplied to the connector 202 and the switching clock SWCK are supplied to the switch circuit 201, thereby generating the time-division-multiplexed high-order section frame signal $S_{OUT}$. The generated signal SOUT is transmitted to a predetermined terminal of the connector 202.

Figure 17:
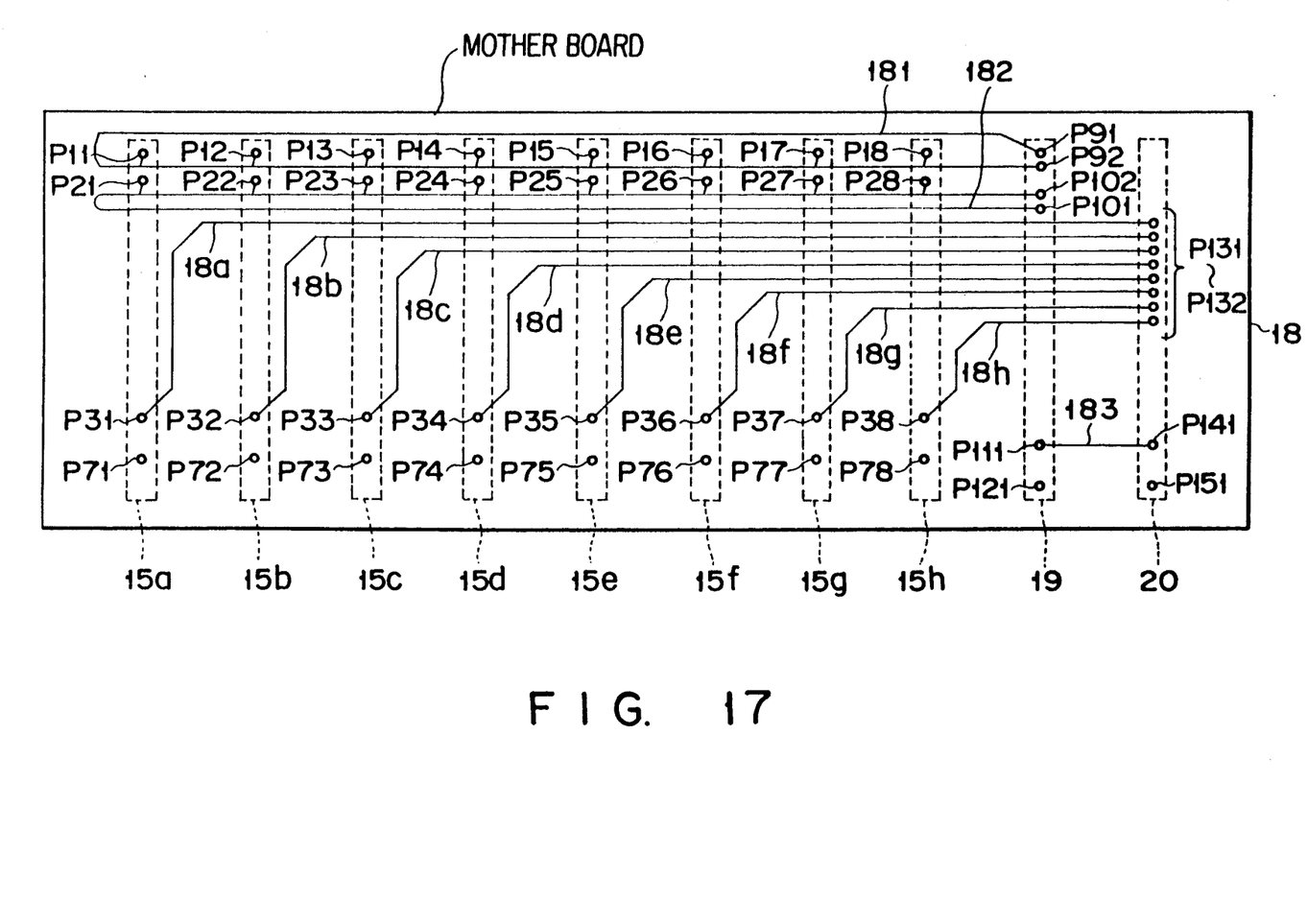
FIG. 17 is a view illustrating a structure of a mother board of the apparatus shown in FIG. 14.

Specifically, the mother board 18 is so constructed as shown in FIG. 17. In FIG. 17, the clock generating board 19 and the high-order section frame processing board 20 are arranged in parallel with the low-order section frame processing boards 15a to 15h. Though not shown, the low-order section frame processing boards 15a to 15h are shielded from the clock generating board 19 and the high-order section frame processing board 20.

The clock generating board 19 is arranged on the right of the low-order section frame processing board 15h in FIG. 17 and is provided with connector pins P91, P92, P101, P102, P111, and P121 which are connected to the connector 198 of the board 19. The connector pin P91 is a BCK input pin, P92 is a BCK terminal pin, P101 is an FCK input pin, P102 is an FCK terminal pin, P111 is an SWCK input pin, and P112 is an SCK input pin.

The high-order section frame processing board 20 is arranged on the right of the clock generating board 19 in FIG. 17 and is provided with connector pins P131 to P138, P141, and P151 which are connected to the connector 202 of the board 20. The connector pins P131 to P138 are low-order section frame signal input pins of channels, P141 is an SWCK output pin, and P151 is a time-division multiplex signal output pin.

A BCK bus line 181, an FCK bus line 182, an SWCK transmission line 183, and low-order section frame signal transmission lines 18a to 18h are formed on the mother board 18.

The bus lines 181 and 182 are connected to at one end to the BCK and FCK input pins P91 and P101, respectively. The bus lines 181 and 182 extend from the input pins to the left side of FIG. 17 and then return to the right side of FIG. 17 to be connected to the BCK and FCK terminal pins P92 and P102, respectively. The BCK output pins P11 to P18 for supplying the clock BCK to the low-order section frame processing boards 15a to 15h are connected to the return line of the bus line 181, and the FCK output pins P21 to P28 for supplying the clock FCK to the boards 15a to 15h are connected to the return line of the bus line 182.

One end of the SWCK transmission line 183 is connected to the SWCK output pin P111, and the other end thereof is connected to the SWCK input pin P141. The low-order section frame signal transmission lines 18a to 18h are connected at one end to the low-order section frame signal input pins P31 to P38, and they are directly connected at the other end to the low-order section frame signal output pins P131 to P138 fixed into the high-order section frame processing board 20.

According to the above arrangement, the clock generating board 19 is arranged on the right of the low-order section frame processing boards 15a to 15h. Since the clocks BCK and FCK are supplied in sequence from the board 15a, and the low-order section frame signals $S_{F1}$ to $S_{F8}$ are output in sequence from the board 15h, the processing time is the same in each channel. The low-order section frame signals $S_{F1}$ to $S_{F8}$ can thus be supplied in the same phase to the high-order section frame processing board 20.

Since the clock generating board 19 functions as a terminal circuit and is mounted on the mother board together with the low-order section frame processing boards 15a to 15h, neither a clock distribution board nor a terminal circuit board is needed. Further, since the high-order section frame processing board 20 is also mounted on the mother board 18, the low-order section frame signals $S_{F1}$ to $SF_8$ can be directly supplied to the high-order section frame processing board 20 and therefore a flat cable is not needed.

In the above embodiments, the low-order section frame processing boards 15a to 15h are arranged at regular intervals. However, they can be arranged at arbitrary intervals since the processing time is the same in each channel. Even if one of the low-order section frame processing boards 15a to 15h in an arbitrary channel is not mounted on the mother board, a problem does not occur in the relationship in phase between the other boards. In other words, if a number of low-order section frame processing boards are previously mounted on the mother board, the number of channels can be increased or decreased when necessary. The apparatus is thus excellent in channel extensibility.

In the above embodiments, the bit clock, frame clock, and switching clock are used. The present invention is not limited to these clocks but can be applied to a byte delimiting signal and a differential signal.

The present invention is not limited to the above embodiments. Various changes and modifications can be made without departing from the scope of the subject matter of the present invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A digital signal time-division multiplex apparatus for time-divisionally multiplexing digital signals of a plurality channels, comprising:
   a plurality of section frame processing boards, each provided to receive digital signals from a respective channel and each including processing means converting digital signals supplied thereto from the respective channel into a respective section frame signal based on sync signals supplied from sync signal input terminals, and each provided with an output terminal where said respective section frame signal is output;
   a time division multiplex processing board including a plurality of input terminals each for receiving said respective section frame signal from said plurality of section frame processing boards, and processing means for time-divisionally multiplexing section frame signals received at said input terminals;
   a sync signal generating board for generating the sync signals and having output terminals from which generated sync signals are output to said plurality of section frame processing boards;
   a mother board on which said plurality of section frame processing boards are mounted in parallel and on which sync signal transmitting lines and a plurality of section frame signal transmitting lines are formed in a pattern, said sync signal transmitting lines being formed in a direction in which said plurality of section frame processing boards are arranged, each having an input terminal for a sync signal at one end thereof and an output terminal for said sync signal at another end thereof, said sync signals supplied to said plurality of said section frame processing boards in a one way bus line system, each of said section frame signal transmitting lines being formed in a direction in which said plurality of section frame processing boards are arranged, wherein section frame signals output from said plurality of section frame processing boards of corresponding channels are input into one end of each of the frame signal transmitting lines and output from opposite ends thereof, wherein a respective path-length is defined between the one end of each of said sync signal transmitting lines and the opposite end of the respective of the section frame signal transmitting lines connected to the same section frame processing board and each path-length from said one end of each of said sync signal transmitting lines to said opposite end of the respective of said section frame signal transmitting lines being equal;
   sync signal transmitting means for connecting the output terminals of said sync signal generating board where sync signals are output to terminal ends of said sync signal transmitting lines formed on said mother board; and
   frame signal transmitting means for connecting each output end of said plurality of section frame signal transmitting liens formed on said mother board with a respective of the input terminals of said time-division multiplex processing board by use of paths having a same length.

2. The apparatus according to claim 1, wherein said sync signal generating board is directly connected with one end of said sync signal transmitting lines and has a terminal processing portion for terminal-processing said sync signals.

3. The apparatus according to claim 1, wherein said frame signal transmitting means connects each output terminal of a plurality of frame signal transmitting lines on said mother board with said plurality of input terminals of said time division multiplex processing board where section frame signals are input.

4. The apparatus according to claim 1, wherein said time-division multiplex processing board is mounted on said mother board, and said frame signal transmitting means directly connects output terminals of said plurality of section frame signal transmitting lines on said mother board with terminals of said time-division multiplex processing board where a plurality of section frame signals are input.

5. The apparatus according to claim 1, comprising:
   a plurality of resistors through which said sync signals are output to said sync signal transmitting lines.

* * * * *